(12) United States Patent
Wang et al.

(10) Patent No.: US 12,354,287 B1
(45) Date of Patent: Jul. 8, 2025

(54) METHOD AND SYSTEM FOR POSITIONING MOVING TARGET BASED ON CAMERA PITCH

(71) Applicant: SHANDONG UNIVERSITY, Jinan (CN)

(72) Inventors: Xu Wang, Jinan (CN); Fei Ma, Jinan (CN); Zihan Wang, Jinan (CN); Yunpeng Guo, Jinan (CN); Weihao Yang, Jinan (CN); Rongjian Dai, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 19/089,174

(22) Filed: Mar. 25, 2025

(30) Foreign Application Priority Data

Nov. 15, 2024 (CN) .......................... 202411631647.4

(51) Int. Cl.
*G06V 20/58* (2022.01)
*G06T 7/277* (2017.01)
(52) U.S. Cl.
CPC .............. *G06T 7/277* (2017.01); *G06V 20/58* (2022.01); *G06T 2207/30244* (2013.01)
(58) Field of Classification Search
CPC .......... G06T 7/277; G06T 2207/30244; G06V 20/58
See application file for complete search history.

(56) References Cited

FOREIGN PATENT DOCUMENTS

| CN | 117221730 A | 12/2023 |
| CN | 118411429 A | 7/2024 |
| CN | 118799749 A | 10/2024 |
| JP | 2000209577 A | 7/2000 |

OTHER PUBLICATIONS

Yuan, Huimin, "Research on Terrain High-Altitude Aerial Survey Error Correction Based on Airborne LiDAR Digital Technology", Survey World, vol. 3, Jun. 30, 2021.
Fei Ma et al., "Real-time accident risk identification for freeway weaving segments based on video analytics", Measurement, 242 (2025) 115783, Sep. 25, 2024.

*Primary Examiner* — Sam Bhattacharya
(74) *Attorney, Agent, or Firm* — IPRO, PLLC

(57) ABSTRACT

The present invention discloses a method for positioning a moving target based on a camera pitch, including: obtaining a vehicle trajectory of a moving target in a to-be-detected video and performing coordinate conversion; performing positioning correction on vehicle trajectory by using error correction method, to obtain final vehicle positioning, where a positioning correction process includes: obtaining a camera height and a camera pitch, constructing a relationship between camera height and camera pitch and a coordinate conversion error, calculating a coordinate conversion error, and calculating a target actual vehicle location based on the coordinate conversion error, to obtain vehicle positioning coordinates. In the present invention, a theoretical relationship between positioning error and camera installation height and angle is deduced based on an imaging principle and a geometrical projection relationship of an optical lens of the camera, so as to perform accurate error correction to implement high-precision positioning of a moving target.

8 Claims, 4 Drawing Sheets

METHOD AND SYSTEM FOR POSITIONING MOVING TARGET BASED ON CAMERA PITCH

CROSS-REFERENCE TO RELATED APPLICATIONS

The present invention claims priority to Chinese Patent Application No. 202411631647.4, filed with the China National Intellectual Property Administration on Nov. 15, 2024 and entitled "METHOD AND SYSTEM FOR POSITIONING MOVING TARGET BASED ON CAMERA PITCH", which is incorporated herein by reference in its entirety and constitutes a part of the present invention and is used for all purposes.

TECHNICAL FIELD

The present invention relates to the field of vehicle positioning technologies, and in particular, to a method and system for positioning a moving target based on a camera pitch.

BACKGROUND

The description in this section merely provides background information related to the present invention and does not necessarily constitute the prior art.

Collecting driving data of vehicles on a road in real time is crucial for intelligent road monitoring, surveillance, operation, and management. Rapid development of information collection technologies enables more and more surveillance cameras to be installed on roads, and development of computer vision technologies further provides reliable technical support for real-time vehicle track data extraction based on videos. However, for a type of moving target such as a vehicle, a moving trajectory of the vehicle is not regular and always dynamically changes due to driving demand of a driver and a running status of a road traffic flow. Therefore, precise positioning of a moving trajectory of a moving target based on a video gradually becomes a challenge that current studies focus on.

Currently, it is difficult for a traffic surveillance camera installed at a fixed location on a road to perform camera calibration, and surveillance cameras on different roads have different heights and angles, which hinders accurate positioning of a moving vehicle. In addition, previous studies focus on detection tracking of a moving target and ignore error accumulation in a tracking process of a moving track. Besides, a relationship between an installation location height and a pitch of a camera and positioning precision of a moving target is not considered in previous studies.

SUMMARY

In view of the shortcomings of the prior art, an objective of the present invention is to provide a method and system for positioning a moving target based on a camera pitch. A theoretical relationship between a positioning error and a camera installation height and angle is deduced based on an imaging principle and a geometrical projection relationship of an optical lens of the camera, so as to perform accurate error correction to implement high-precision positioning of a moving target.

To achieve the above objective, the present invention uses the following technical solutions:

According to a first aspect of the present invention, a method for positioning a moving target based on a camera pitch is provided, including:
  obtaining a to-be-detected video, and performing target detection and target tracking on a moving target in the video, to obtain a vehicle trajectory;
  performing coordinate conversion on the vehicle trajectory by using a coordinate conversion method;
  performing positioning correction on the vehicle trajectory by using an error correction method, to obtain final vehicle positioning, where a positioning correction process includes: obtaining a camera height and a camera pitch, constructing a relationship between a camera height and a camera pitch and a coordinate conversion error, calculating a coordinate conversion error according to the relationship between a camera height and a camera pitch and a coordinate conversion error, and calculating a target actual vehicle location based on the coordinate conversion error, to obtain vehicle positioning coordinates; and
  positioning and tracking a location of the moving target in the video in the real world according to the obtained vehicle positioning coordinates.

Further, target detection is performed on the moving target in the to-be-detected video by using YOLOv5, to obtain the moving target, and target tracking is performed on the moving target by using DeepSORT, to obtain the vehicle trajectory.

Further, specific steps of performing target detection on the moving target in the to-be-detected video by using YOLOv5 are:
  segmenting the to-be-detected video into grids;
  performing prediction on each of the grids to obtain a boundary box and a probability that each of boundary boxes belongs to a different category; and
  removing, by using a non-maximum suppression algorithm, boundary boxes whose overlapping exceeds a specified threshold, and selecting a final detection result.

Further, specific steps of performing target tracking on the moving target by using DeepSORT are:
  predicting a location and a status of a target in a next frame by using a recursive Kalman filter algorithm, performing IOU matching on a prediction box and a boundary box, and selecting a prediction result having a higher confidence level;
  performing data correlation by using a linear weighting function based on a Mahalanobis distance of movement information and a cosine similarity of an appearance feature, and performing tracking trajectory matching through cascade allocation, to obtain a tracking result; and
  synchronously updating a tracker parameter and repeating an algorithm procedure.

Further, specific steps of performing coordinate conversion on the vehicle trajectory by using the coordinate conversion method are:
  establishing the geodetic coordinate system according to a projection principle;
  obtaining a camera parameter and establishing the pixel coordinate system;
  calculating a conversion relationship between the geodetic coordinate system and the pixel coordinate system according to the vehicle trajectory; and
  converting pixel coordinates of the moving target photographed by the camera into geodetic coordinates based on the conversion relationship.

Further, specific steps of constructing a relationship between a camera height and a camera pitch and a coordinate conversion error are:
  calculating centroid coordinates of a target vehicle boundary box in a pixel coordinate system;
  calculating centroid coordinates of the target vehicle boundary box in a geodetic coordinate system after coordinate conversion; and
  determining the relationship between a camera height and a camera pitch and a coordinate conversion error according to a difference between the centroid coordinates of the pixel coordinate system and the centroid coordinates of the geodetic coordinate system.

Further, the relationship between a camera height and a camera pitch and a coordinate conversion error is represented as:

$$\Delta X =$$

$$\Delta X = \frac{b_2(2x_2 - w) - b_3(2x_2 - w) - b_4(2x_1 - w)}{4w}, \text{ and}$$

$$\Delta Y = 2h\tan\left(\phi + \arctan\frac{h_0 - y_1 - y_2}{2f}\right) - \frac{1}{6}h\tan\left(\phi + \arctan\frac{h_0 - 2y_1}{2f}\right)$$
$$- \frac{2}{3}h\tan\left(\phi + \arctan\frac{h_0 - 2y_2}{2f}\right);$$

where in the formula, $\Delta X$ represents a horizontal coordinate error after coordinate conversion, $\Delta Y$ represents a vertical coordinate error after coordinate conversion, $P_1(x_1, y_1)$, $P_2(x_2, y_2)$, $P_3(x_2, y_1)$, and $P_4(x_1, y_2)$ are four vertex coordinates corresponding to the vehicle boundary box in pixel-level coordinates, $b_0$, $b_1$, $b_2$, $b_3$, and $b_4$ are respectively $b_s$ corresponding to $P_0$, $P_1$, $P_2$, $P_3$, and $P_4$, $b_s$ is a half of a projection length corresponding to any point in horizontal projection, a frame width and a frame height of a video image are respectively w and $h_0$, a focal length of a camera is f, h is a height of the camera from the ground, $\theta$ is a vertical field of view of the camera, and $\phi$ is a vertical approach angle of the camera.

According to a second aspect of the present invention, a system for positioning a moving target based on a camera pitch is provided, including:
  a target detection and tracking module, configured to obtain a to-be-detected video, and perform target detection and target tracking on a moving target in the video, to obtain a vehicle trajectory;
  a coordinate conversion module, configured to perform coordinate conversion on the vehicle trajectory by using a coordinate conversion method; and
  an error correction module, configured to perform positioning correction on the vehicle trajectory by using an error correction method, to obtain final vehicle positioning, where a positioning correction process includes: obtaining a camera height and a camera pitch, constructing a relationship between a camera height and a camera pitch and a coordinate conversion error, calculating a coordinate conversion error according to the relationship between a camera height and a camera pitch and a coordinate conversion error, and calculating a target actual vehicle location based on the coordinate conversion error, to obtain vehicle positioning coordinates; and position and track a location of the moving target in the video in the real world according to the obtained vehicle positioning coordinates.

According to a third aspect of the present invention, a medium is provided, storing a program, where the program is executed by a processor to perform the steps of the method for positioning a moving target based on a camera pitch according to the first aspect of the present invention.

According to a fourth aspect of the present invention, a device is provided, including a memory, a processor, and a program stored on the memory and executable on the processor, where when the processor executes the program, the steps of the method for positioning a moving target based on a camera pitch according to the first aspect of the present invention are performed.

The foregoing one or more technical solutions have the following beneficial effects:

The present invention discloses a method and system for positioning a moving target based on a camera pitch. To resolve the problem of error accumulation in the current target tracking process of the moving vehicle, in a process of converting the vehicle location from pixel coordinates to geodetic coordinates, a theoretical relationship between a positioning error and a camera installation height and angle is deduced based on an imaging principle and a geometrical projection relationship of an optical lens of the camera, so as to perform accurate error correction to implement high-precision positioning of a moving target.

Advantages of additional aspects of the present invention will be given in the following description, and will be apparent from the following description, or may be learned by practice of the present invention.

BRIEF DESCRIPTION OF THE DRAWINGS

The accompanying drawings of the specification constituting a part of the present invention are used to provide further understanding of the present invention. The exemplary Examples of the present invention and descriptions thereof are used to explain the present invention, and do not constitute an improper limitation of the present invention.

DETAILED DESCRIPTION

It should be noted that, the following detailed descriptions are all exemplary, and are intended to provide further descriptions of the present invention. Unless otherwise specified, all technical and scientific terms used herein have the same meanings as those usually understood by a person of ordinary skill in the art to which the present invention belongs.

It should be noted that the terms used herein are merely used for describing specific implementations, and are not intended to limit exemplary implementations of the present invention. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof.

Example 1

Example 1 of the present invention provides a method for positioning a moving target based on a camera pitch. First, target detection and tracking are performed by using YOLOv5+DeepSORT, to output a pixel-level vehicle trajectory. The pixel-level trajectory is subsequently converted into real-world coordinates by using a coordinate conversion method. Finally, positioning correction is performed by using an error correction method.

Figure 1:
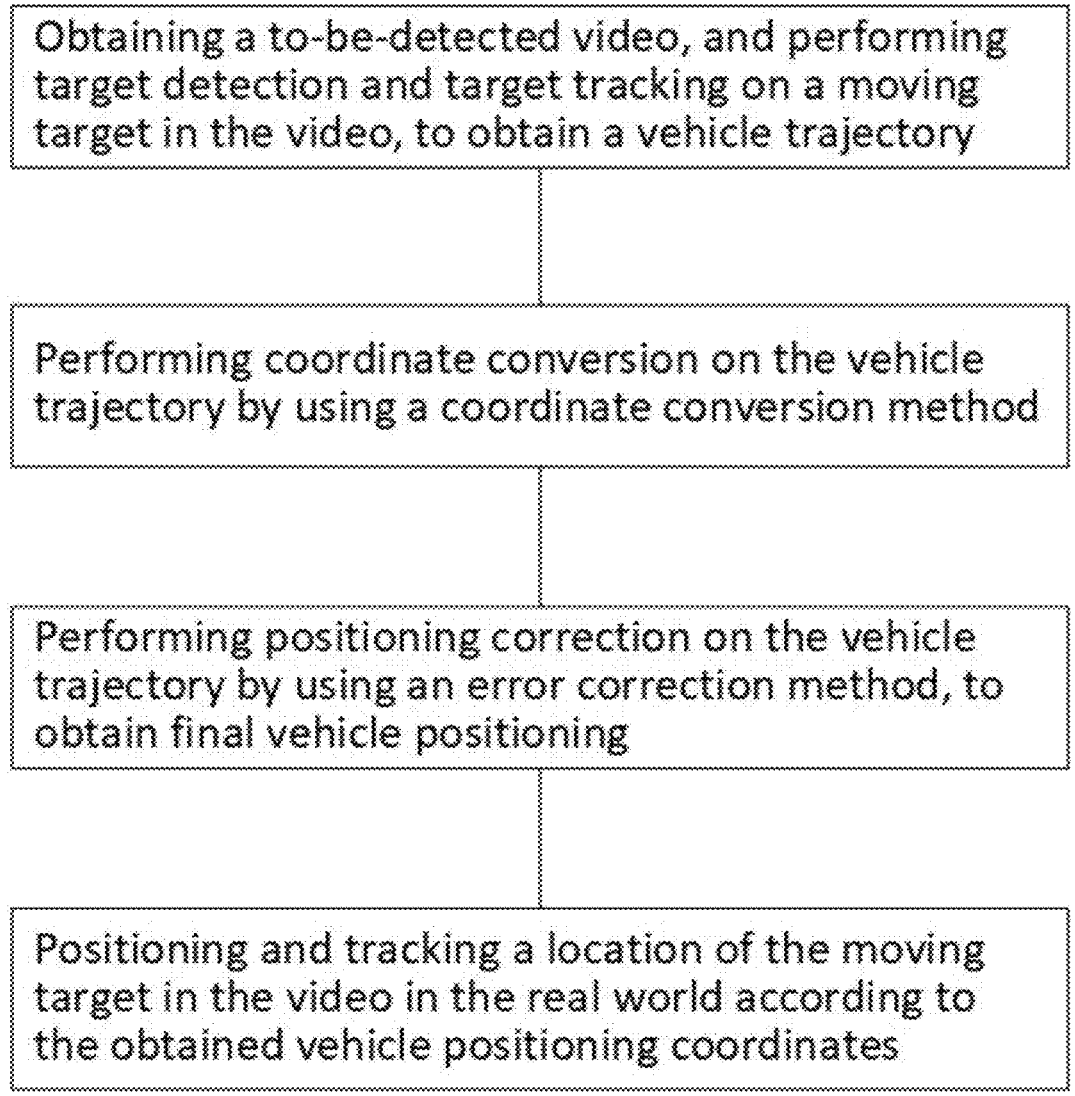
FIG. 1 is a flowchart of a method for positioning a moving target based on a camera pitch according to Example 1 of the present invention.

As shown in FIG. 1, a method for positioning a moving target based on a camera pitch, including:

Step 1: Obtaining a to-be-detected video, and perform target detection and target tracking on a moving target in the video, to obtain a vehicle trajectory.

Step 1.1: Obtaining the to-be-detected video.

The development of computer vision technologies makes it possible to detect and track a target object in an entire video frame according to a spatial and temporal feature of the target object. Technically, tracking refers to obtaining an initial detection set and allocating unique IDs to target objects, to track the target objects in an entire frame of a video source. Target tracking may be usually divided into two steps: 1) Target detection—this step is responsible for detecting and positioning an object in a video image by using some detectors (for example, YOLOv5 and CenterNet); 2) Motion trajectory predictor—this step is responsible for predicting a future movement of an object by using previous information of the object. During vehicle target detection and tracking based on a video stream, multiple targets need to be simultaneously tracked, and a target is prone to be blocked. Therefore, in the present example, YOLOv5 is combined with a multi-target track algorithm DeepSORT, to detect a moving vehicle target in real time and output a pixel-level trajectory of the target.

Step 1.2: Performing target detection on the moving target in the to-be-detected video by using YOLOv5, to obtain the moving target.

Compared with a conventional target detection algorithm, YOLOv5 has a faster detection speed and higher accuracy. YOLOv5 directly predicts boundary box and category information from an inputted image by converting a target detection task into a regression issue. YOLOv5 extracts image features through a series of convolutional layers and feature pyramid networks, can automatically adapt to targets of different sizes and shapes, and currently has been widely applied to target detection in transportation, surveying, and agriculture fields. YOLOv5 combines a convolutional neural network and a Kalman filter to implement accurate target tracking.

In the present example, specific steps of performing target detection on the moving target in the to-be-detected video by using YOLOv5 are:

Step 1.2.1: Segmenting the to-be-detected video into grids.

Step 1.2.2: Performing prediction on each of the grids to obtain a boundary box and a probability that each of boundary boxes belongs to a different category.

Step 1.2.3: Removing, by using a non-maximum suppression algorithm, boundary boxes whose overlapping exceeds a specified threshold, and select a final detection result.

Step 1.3: Performing target tracking on the moving target by using DeepSORT, to obtain the vehicle trajectory.

Deep learning-based SORT (DeepSORT) is a multi-target tracking algorithm based on deep learning, and combines advantages of deep learning and a simple online and real-time tracking (SORT) algorithm. DeepSORT reduces identity switching by adding an appearance descriptor, thereby improving tracking efficiency, and is mainly used for multi-target tracking in fields such as video surveillance and autonomous driving.

In the present example, specific steps of performing target tracking on the moving target by using DeepSORT are:

Step 1.3.1: Predicting a location and a status of a target in a next frame by using a recursive Kalman filter algorithm, performing IOU matching on a prediction box and a boundary box, and select a prediction result having a higher confidence level.

Step 1.3.2: Performing data correlation by using a linear weighting function based on a Mahalanobis distance of movement information and a cosine similarity of an appearance feature, and performing tracking trajectory matching through cascade allocation, to obtain a tracking result.

Step 1.3.3: Synchronously updating a tracker parameter and repeating an algorithm procedure.

Figure 2:
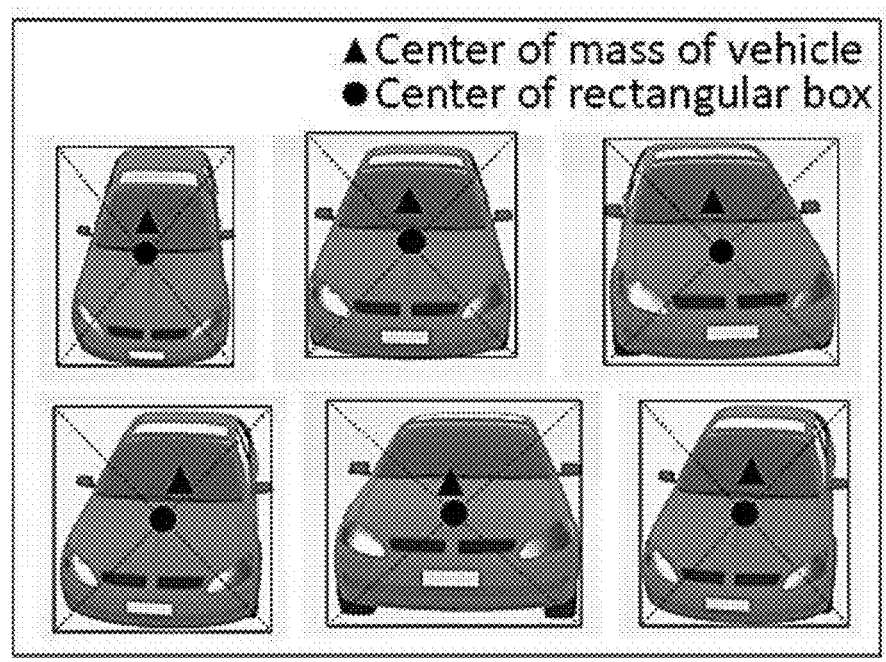
FIG. 2 is a schematic diagram of changes of a vehicle center in different camera states according to Example 1 of the present invention.

However, the vehicle trajectory extracted from the traffic video inevitably has some errors, and these errors may appear in any stage of vehicle target detection and tracking. As shown in FIG. 2, a vehicle detection algorithm usually outputs a rectangular box in each frame to identify and confirm existence of a vehicle, the center of an identified rectangular box (dots in FIG. 2) is considered as a vehicle location, and consecutive vehicle locations form a vehicle trajectory. A size and a shape of the rectangular box used for vehicle identification may be affected by factors such as a photographing height and a pitch of the camera. If there is no error, an actual center location of the rectangular box is the center (a circle in FIG. 2) of a three-dimensional shape of the vehicle. However, in most cases, a determined location is different from an actual location, causing a positioning error. Therefore, it is necessary to deduce a relationship between the positioning error and a factor (a camera pose) that affects the positioning error, so as to perform error correction and improve accuracy of video-based identification and positioning.

An actually photographed road surface may be approximately considered as a 2D plane, and a road surface height difference is relatively small relative to a height of a location of a traffic surveillance camera. Therefore, in the present example, a relationship between a vehicle coordinate location and a positioning error is deduced based on an imaging principle and a geometrical projection relationship of an optical lens of the camera. Because the video-based moving target detection and tracking algorithm outputs pixel-level trajectory information of a moving target, a conversion relationship between a geodetic coordinate system and an image coordinate system is first deduced by using a location height and a pitch of a camera, and then a positioning error of the vehicle is discussed.

Step 2: Performing coordinate conversion on the vehicle trajectory by using a coordinate conversion method.

Step 2.1: Establishing the geodetic coordinate system according to a projection principle.

Figure 3:
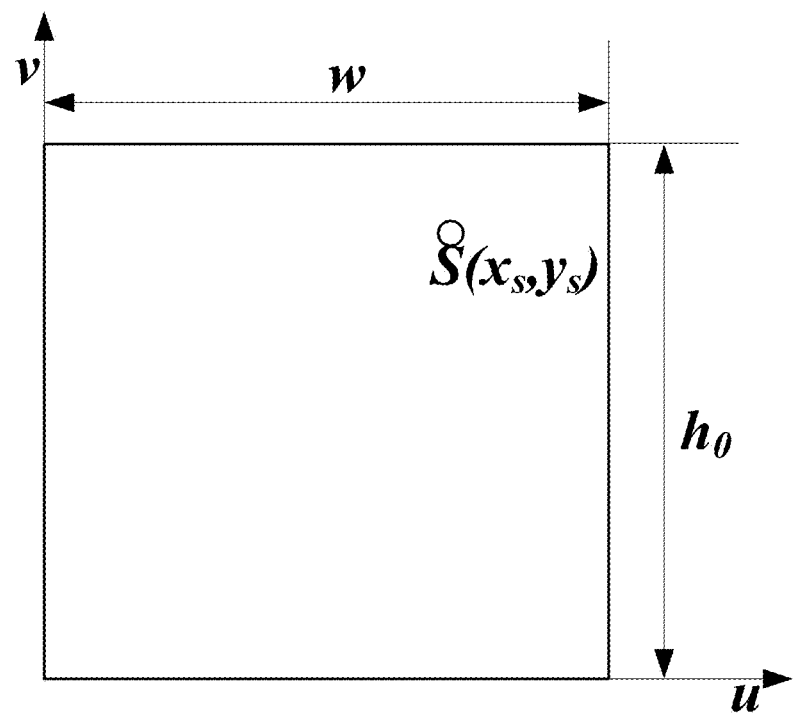
FIG. 3 is a schematic diagram of a pixel coordinate system according to Example 1 of the present invention.
Figure 4:
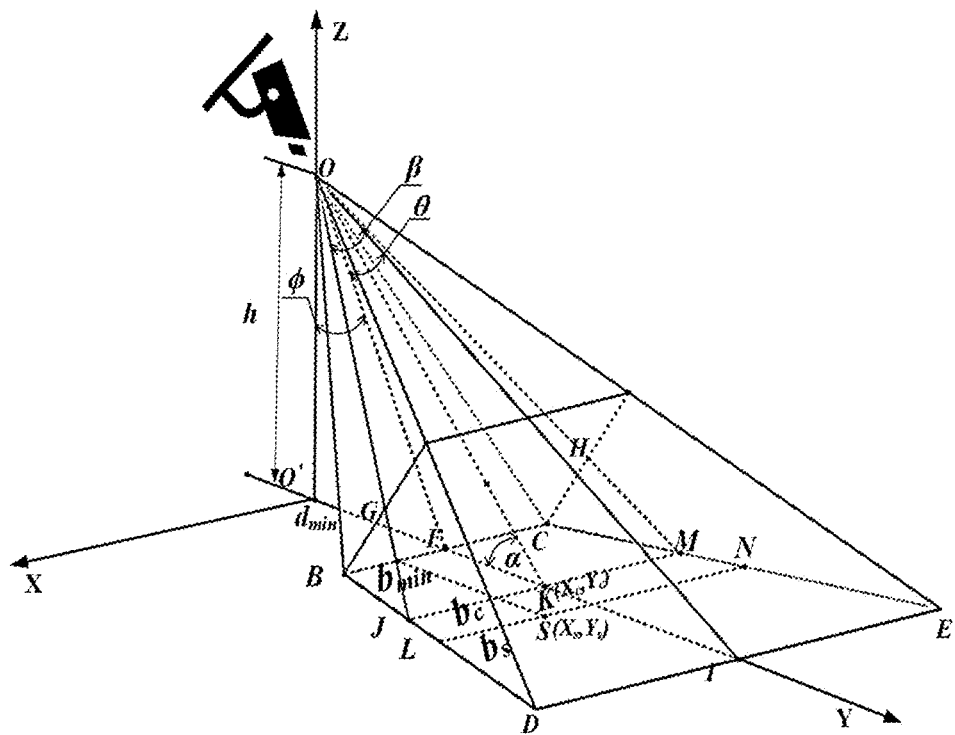
FIG. 4 is a schematic diagram of a ground projection principle according to Example 1 of the present invention.

As shown in FIG. 3, a frame width and a frame height of a video image are respectively w and $h_0$ (pixel), and a focal length of a camera is f (pixel). FIG. 4 shows a projection principle of a camera. A height of the vehicle is insignificant compared with a height of the camera from the ground. Therefore, the height of the vehicle is omitted in the present example. A point O is a photographing location of the camera in the real world, and a point O' is a projection point of the camera on the ground, that is, a line segment OO' is perpendicular to the ground. A point K is an intersection point of a line of sight OK of the camera and the ground, coordinates of the point K are ($X_c$, $Y_c$), a value of ∠O'KO is equal to a pitch a of the camera, ∠FOI is a vertical field of view θ of the camera, ∠GOH is a horizontal field of view β of the camera, the line of sight OK is vertical to a plane BCHG, the quadrilateral shape BCHG is rectangular, and a trapezoidal area BCED is a real-world ground area photographed by the camera. B and C are two vertexes of a bottom edge of an image, D and E are two vertexes of a top edge of an image, F and I are respectively a lowest point and a highest point that can be photographed by the camera in the vertical field of view, and G and H are respectively a nearest point and a farthest point that can be photographed by the camera in the horizontal field of view. A line segment JM is a projection length of the line of sight OK of the camera in a horizontal direction, a line segment LN is a corresponding projection length in a horizontal direction when a vertical distance is equal to $Y_s$, h is a height of the camera from the ground, $d_{min}$ is an actual distance between a bottom edge of an image and the camera, $b_{min}$ is a horizontal distance between a bottom edge of an image and the camera, and $b_s$ is a half of a projection length corresponding to any point in horizontal projection. $b_c$ is a half of a projection length of the line of sight of the camera in a horizontal direction, S is any point in a photographing range, coordinates of S in the real world are ($X_s$, $Y_s$), and coordinates outputted by the target detection algorithm are ($x_s$, $y_s$). A rectangular coordinate system, that is, a geodetic coordinate system, is established with O' as an origin, a straight line on which O'F located is as a y-axis, a straight line on which OO' is located as a z-axis, and a straight line that passes through the point O' and is perpendicular to a surface O'OF as an x-axis. In the present example, a trajectory in the camera is converted into an actual trajectory in the geodetic coordinate system by using a projection principle.

Step 2.2: Obtaining a camera parameter and establish a pixel coordinate system.

The pixel coordinate system is a two-dimensional rectangular coordinate system, and indicates a location of a pixel in an image. An origin of the pixel coordinate system is located at an upper left corner of the image, and a horizontal axis (a u axis) and a vertical axis (a v axis) of the pixel coordinate system are respectively parallel to a column and a row of the image. The pixel coordinate system does not use a physical unit (for example, mm), and instead uses a pixel as a unit. Therefore, the pixel coordinate system is very suitable for digital image processing.

Step 2.3: Calculating a conversion relationship between the geodetic coordinate system and the pixel coordinate system according to the vehicle trajectory.

As shown in FIG. 4, it is assumed that a vertical approach angle of the camera ∠O'OF=ϕ. It is known that $$\phi = 90° - \angle O'KO - \angle FOK = 90° - \alpha - \frac{\theta}{2},$$

where α is a pitch of the camera, and θ is a vertical field of view of the camera and is represented as ∠FOI in FIG. 4. A calculation process of a horizontal distance $X_s$ and a vertical distance $Y_s$ between any point S($x_s$, $y_s$) and the camera in real world space within a photographing range is as follows:

First, an actual distance $d_{min}$ (m) between a bottom edge of an image and the camera and an actual distance $d_{max}$ between a top edge of an image and the camera are respectively:

$$d_{min} = h \tan\phi \quad (1)$$

$$d_{max} = h \tan(\phi+\theta) \quad (2)$$

where, h is a height (m) between the camera and the ground.

An angle location Δθ(°) of any point S in an image in the vertical field of view is:

$$\Delta\theta = \frac{(h_0 - y_s) \times \theta}{h_0} \quad (3)$$

where, $y_s$ is a vertical coordinate value (pixel level) of any point S in the vehicle trajectory of the moving target. In the present example, the vehicle trajectory of the moving target is an output of the target detection and tracking algorithm based on YOLOv5+DeepSORT.

After the foregoing solving process, a vertical distance $Y_s$ of an actual location of the moving target, that is, the vehicle in the geodetic coordinate system and the camera may be obtained as:

$$Y_s = h \tan(\phi+\Delta\theta) \quad (4)$$

Subsequently, a horizontal distance $X_s$ between the moving target and the camera in the real world space is solved as follows:

A horizontal distance $b_{min}$ (m) between a bottom edge of an image and the camera is:

$$b_{min} = h\sec\phi\cos\frac{\theta}{2}\tan\frac{\beta}{2} \quad (5)$$

The vertical distance $X_s$ of the actual location of the moving target, that is, the vehicle in the geodetic coordinate system is related to a length of $b_s$, and the length of $b_s$ needs to be solved based on a half $b_c$ of a projection length of a line of sight of the camera in a horizontal direction and a horizontal distance $b_{min}$ between a bottom edge of an image and the camera. Therefore, calculation steps are as follows:

The half of the projection length of the line of sight OK of the camera in the horizontal direction is a line segment KJ or a line segment KM. A length $b_c$ (m) of the line segment KJ or the line segment KM is:

$$b_c = h\sec\left(\phi + \frac{\theta}{2}\right)\tan\frac{\beta}{2} \quad (6)$$

A length of a distance between a point K of the camera and a ground projection point O' of the camera is a line segment KO'. A length $Y_c$ (m) of the line segment KO' is:

$$Y_c = h\tan\left(\phi + \frac{\theta}{2}\right) \quad (7)$$

The projection length corresponding to the horizontal projection location is a line segment LN. A half $b_s$ (m) of a length of the line segment LN is:

$$b_s = b_{min} + (b_c - b_{min})\frac{Y_s - d_{min}}{Y_c - d_{min}} \quad (8)$$

After the foregoing solving process, a vertical distance $X_s$ of an actual location of the moving target, that is, the vehicle in the geodetic coordinate system may be obtained as:

$$X_s = 2b_s\frac{\left(x_s - \frac{w}{2}\right)}{w} \quad (9)$$

Step 2.4: Converting pixel coordinates of the moving target photographed by the camera into geodetic coordinates based on the conversion relationship.

Based on the foregoing formula deduction, the conversion relationship between the geodetic coordinate system and the pixel coordinate system may be obtained, and location coordinates of any point S in the real world may be obtained. Based on this, in consideration of a possible positioning error shown in FIG. 2, in the present example, a positioning error relationship of the vehicle is further deduced.

Step 3: Performing positioning correction on the vehicle trajectory by using an error correction method, to obtain final vehicle positioning, where a positioning correction process includes:

Step 3.1: Obtaining a camera height and a camera pitch.

Step 3.2: Constructing a relationship between a camera height and a camera pitch and a coordinate conversion error.

Step 3.2.1: Calculating centroid coordinates of a target vehicle boundary box in the pixel coordinate system.

Figure 5:
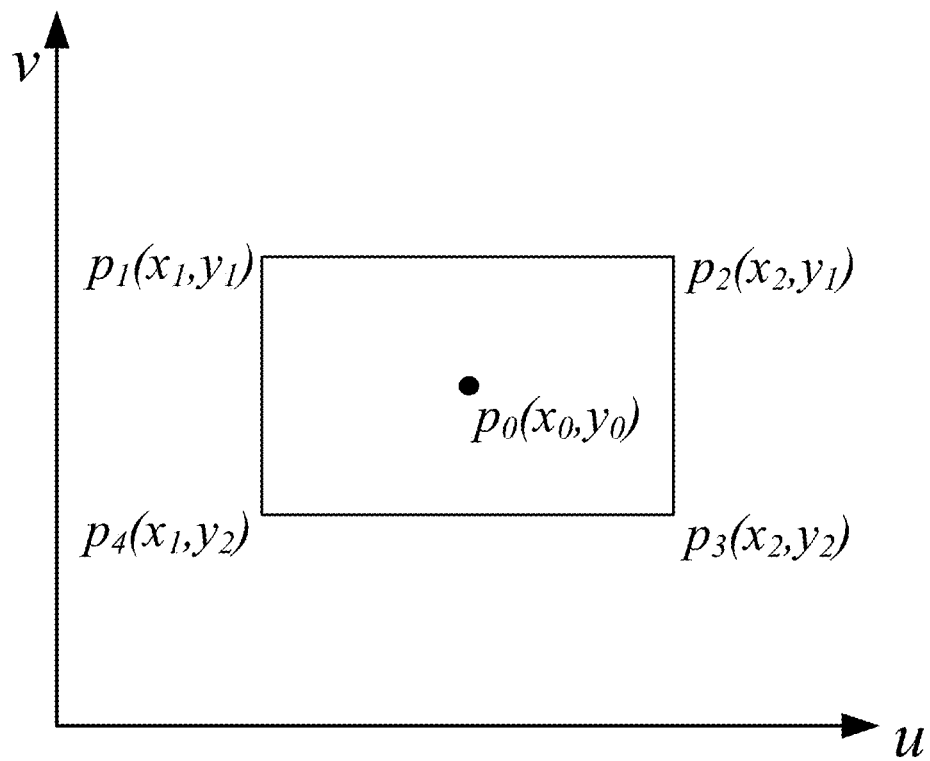
FIG. 5 is a schematic diagram of a boundary box in a pixel coordinate system according to Example 1 of the present invention.

As shown in FIG. 5, it is assumed that four vertexes of a rectangular vehicle boundary box in the pixel coordinate system are respectively $P_1(x_1, y_1)$, $P_2(x_2, y_2)$, $P_3(x_2, y_1)$, and $P_4(x_1, y_2)$, and outputted centroid coordinates are $P_0(x_0, y_0)$.

Step 3.2.2: Calculating centroid coordinates of the target vehicle boundary box in a geodetic coordinate system after coordinate conversion.

Figure 6:
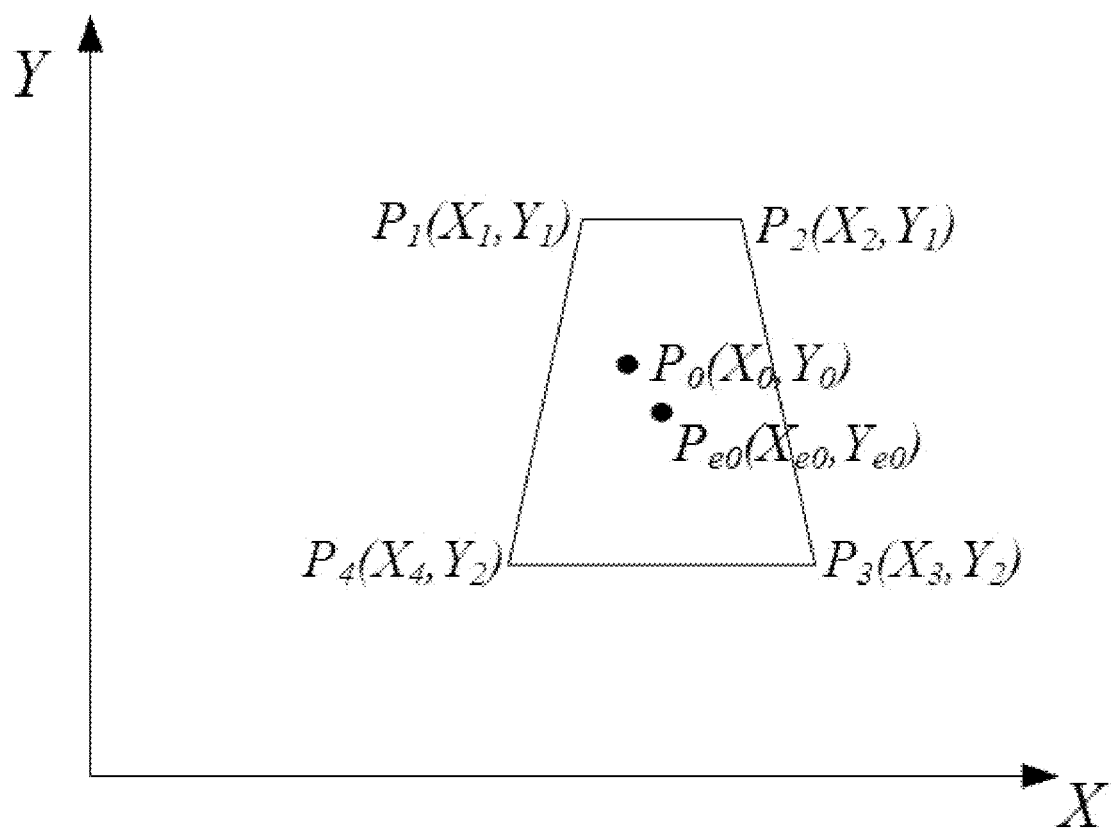
FIG. 6 is a schematic diagram of projection in a geodetic coordinate system according to Example 1 of the present invention.

Because conversion between different coordinate systems is complex and nonlinear, coordinate conversion is separately performed on the four vertexes of the rectangular boundary box to obtain a new trapezoidal area. The trapezoidal area may be simplified into an isosceles trapezoid, as shown in FIG. 6. For an isosceles trapezoid, when location coordinates of four vertexes of the isosceles trapezoid are known, centroid coordinates of the isosceles trapezoid are:

$$P_{e0}(X_{e0}, Y_{e0}) = P_{e0}\left(\frac{X_1 + X_2 + X_3 + X_4}{4}, \frac{(Y_2 - Y_1)[(X_4 - X_3) + 2(X_2 - X_1)]}{3(X_2 + X_4 - X_1 - X_3)}\right),$$

where, $P_{e1}(X_1, Y_1)$, $P_{e2}(X_2, Y_2)$, $P_{e3}(X_3, Y_3)$, $P_{e4}(X_4, Y_4)$, and outputted centroid coordinates are $P_{e0}(X_{e0}, Y_{e0})$. In the present case, the centroid $P_0(X_0, Y_0)$ of the rectangle is not equal to the centroid $P_{e0}(X_{e0}, Y_{e0})$ of the new isosceles trapezoid.

Step 3.2.3: Determine the relationship between a camera height and a camera pitch and a coordinate conversion error according to a difference between the centroid coordinates of the pixel coordinate system and the centroid coordinates of the geodetic coordinate system.

According to the foregoing coordinate conversion formula, a difference between the real centroid of the vehicle in the real world and the outputted centroid after coordinate conversion may be deduced as:

$$\Delta X = \frac{4b_0(x_1 + x_2 - w) - b_1(2x_1 - w) - b_2(2x_2 - w) - b_3(2x_2 - w) - b_4(2x_1 - w)}{4w} \quad (10)$$

$$\Delta Y = 2h\tan\left(\phi + \arctan\frac{h_0 - y_1 - y_2}{2f}\right) - \quad (11)$$
$$\frac{1}{6}h\tan\left(\phi + \arctan\frac{h_0 - 2y_1}{2f}\right) - \frac{2}{3}h\tan\left(\phi + \arctan\frac{h_0 - 2y_2}{2f}\right)$$

In the formula, $\Delta X$ represents a horizontal coordinate error after coordinate conversion, $\Delta Y$ represents a vertical coordinate error after coordinate conversion, $P_1(x_1, y_1)$, $P_2(x_2, y_2)$, $P_3(x_2, y_1)$, and $P_4(x_1, y_2)$ are four vertex coordinates corresponding to the vehicle boundary box in pixel-level coordinates, $b_0$, $b_1$, $b_2$, $b_3$, and $b_4$ are respectively $b_s$ corresponding to $P_0$, $P_1$, $P_2$, $P_3$, and $P_4$, $b_s$ is a half of a projection length corresponding to any point in horizontal projection, a frame width and a frame height of a video image are respectively w and $h_0$, a focal length of a camera is f, h is a height of the camera from the ground, $\theta$ is a vertical field of view of the camera, and $\phi$ is a vertical approach angle of the camera.

A calculation formula of $b_s$ corresponding to any point is:

$$b_s = b_{min} + (b_c - b_{min})\frac{Y_s - d_{min}}{Y_c - d_{min}},$$

where, $b_c$ is a half of a projection length of a line of sight of the camera in a horizontal direction, and $b_{min}$ is a horizontal distance between a bottom edge of an image and the camera. A calculation manner of $b_1, b_2, \ldots, b_n$ is the same as that of $b_s$, each represents a half of a projection length of each point in horizontal projection, and n is a total number of labels of points.

It may be known according to formula (11) that $b_s$ corresponding to any point is related to Y, that is, $b_s$ is also related to h and $\phi$. Further, it may be known according to formula (10) and formula (11) that coordinate conversion errors $\Delta X$ and $\Delta Y$ are affected by the camera height and the camera pitch. A relationship between coordinate conversion errors and a camera height and a camera pitch is shown in formula (10) and formula (11). Therefore, the corrected vehicle location is obtained in the present example, as shown in formula (12) and formula (13). In addition, in subsequent studies, a camera height and a camera angle should be used as important factors for eliminating an error.

Step 3.3: Calculating a location of the vehicle target based on a relationship between a camera height and a camera pitch and a coordinate conversion error, to obtain corrected vehicle positioning $S'(X_{es}, Y_{es})$ of any point $S(X_s, Y_s)$ in the vehicle trajectory. A specific formula is:

$$X_{es} = X_s + \Delta X = 2b_s\frac{\left(x_s - \frac{w}{2}\right)}{w} + b_0\frac{x_1 + x_2 - w}{w} - \quad (12)$$

-continued $$b_1\frac{2x_1-w}{4w}-b_2\frac{2x_2-w}{4w}-b_3\frac{2x_2-w}{4w}-b_4\frac{2x_1-w}{4w}$$

$$Y_{es}=Y_s+\Delta Y=h\tan(\phi+\Delta\theta)+2h\tan\left(\phi+\arctan\frac{h_0-y_1-y_2}{2f}\right)- \tag{13}$$

$$\frac{1}{6}h\tan\left(\phi+\arctan\frac{h_0-2y_1}{2f}\right)-\frac{2}{3}h\tan\left(\phi+\arctan\frac{h_0-2y_2}{2f}\right)$$

where, $X_{es}$ and $Y_{es}$ are respectively location coordinates of the vehicle target after the error correction.

In an on-site test, a vehicle traveling on a road is equipped with an inertial navigation apparatus, and a measurement value of the inertial navigation apparatus is used as a true ground value of positioning precision. Meanwhile, a location height of a camera installed on an unmanned aerial vehicle changes from 30 m to 50 m (changes by 5 m each time), and a pitch changes from 30° to 50° (changes by 5° each time). Trajectory movement statuses of the vehicle target are recorded in different camera poses, and experiment is performed for a total of 25 times. Vehicle trajectories are respectively extracted by using the proposed coordinate conversion method and coordinate calculation method on which error correction has been performed, then these trajectories are compared with true ground measurement values of the inertial navigation apparatus, and an average absolute distance error is calculated to evaluate positioning precision. A calculation result shows that values of the proposed coordinate conversion method and method on which error correction has been performed are respectively 2.67 meters and 2.12 meters, that is, the proposed error positioning correction method effectively improves positioning precision in different camera poses.

Example 2

According to Example 2 of the present invention, a system for positioning a moving target based on a camera pitch is provided, including:
- a target detection and tracking module, configured to obtain a to-be-detected video, and perform target detection and target tracking on a moving target in the video, to obtain a vehicle trajectory;
- a coordinate conversion module, configured to perform coordinate conversion on the vehicle trajectory by using a coordinate conversion method; and
- an error correction module, configured to perform positioning correction on the vehicle trajectory by using an error correction method, to obtain final vehicle positioning, where a positioning correction process includes: obtaining a camera height and a camera pitch, constructing a relationship between a camera height and a camera pitch and a coordinate conversion error, calculating a coordinate conversion error according to the relationship between a camera height and a camera pitch and a coordinate conversion error, and calculating a target actual vehicle location based on the coordinate conversion error, to obtain vehicle positioning coordinates; and
- position and track a location of the moving target in the video in the real world according to the obtained vehicle positioning coordinates.

Example 3

According to Example 3 of the present invention, a medium is provided, storing a program, where the program is executed by a processor to perform the steps of the method for positioning a moving target based on a camera pitch according to Example 1 of the present invention.

Example 4

According to Example 4 of the present invention, a device is provided, including a memory, a processor, and a program stored in the memory and executable on the processor, where when the processor executes the program, the steps of the method for positioning a moving target based on a camera pitch according to Example 1 of the present invention are performed.

Steps in Example 2, Example 3, and Example 4 correspond to those in method of Example 1. For specific implementations, refer to related descriptions of Example 1.

A person skilled in the art should understand that the modules or steps of the present invention may be implemented by using a general computer apparatus. Optionally, the modules or steps may be implemented by using program code executable by a computing apparatus, so that the modules or steps may be stored in a storage apparatus and executed by the computing apparatus, or the modules or steps are separately manufactured into integrated circuit modules, or multiple modules or steps of the modules or steps are manufactured into a single integrated circuit module for implementation. The present invention is not limited to any particular combination of hardware and software.

The foregoing descriptions are merely preferred embodiments of the present invention, but are not intended to limit the present invention. A person skilled in the art may make various alterations and variations to the present invention. Any modification, equivalent replacement, or improvement made and the like within the spirit and principle of the present invention shall fall within the protection scope of the present invention.

The invention claimed is:

1. A method for positioning a moving target based on a camera pitch, comprising:
   obtaining a to-be-detected video, and performing target detection and target tracking on a moving target in the video, to obtain a vehicle trajectory;
   performing coordinate conversion on the vehicle trajectory by using a coordinate conversion method; and
   performing positioning correction on the vehicle trajectory by using an error correction method, to obtain final vehicle positioning; wherein a positioning correction process comprises: obtaining a camera height and a camera pitch, constructing a relationship between a camera height and a camera pitch and a coordinate conversion error, calculating a coordinate conversion error according to the relationship between a camera height and a camera pitch and a coordinate conversion error, and calculating a target actual vehicle location based on the coordinate conversion error, to obtain vehicle positioning coordinates; wherein
   specific steps of constructing a relationship between a camera height and a camera pitch and a coordinate conversion error are:
   calculating centroid coordinates of a target vehicle boundary box in a pixel coordinate system;
   calculating centroid coordinates of the target vehicle boundary box in a geodetic coordinate system after coordinate conversion; and
   determining the relationship between a camera height and a camera pitch and a coordinate conversion error according to a difference between the centroid coordinates of the pixel coordinate system and the centroid coordinates of the geodetic coordinate system; wherein the relationship between a camera height and a camera pitch and a coordinate conversion error is represented as:

$$\Delta X = \frac{4b_0(x_1 + x_2 - w) - b_1(2x_1 - w) - b_2(2x_2 - w) - b_3(2x_2 - w) - b_4(2x_1 - w)}{4w};$$

And $$\Delta Y = 2h\tan\left(\phi + \arctan\frac{h_0 - y_1 - y_2}{2f}\right) - \frac{1}{6}h\tan\left(\phi + \arctan\frac{h_0 - 2y_1}{2f}\right) - \frac{2}{3}h\tan\left(\phi + \arctan\frac{h_0 - 2y_2}{2f}\right);$$

wherein, $\Delta X$ represents a horizontal coordinate error after coordinate conversion, $\Delta Y$ represents a vertical coordinate error after coordinate conversion, $P_1(x_1, y_1)$, $P_2(x_2, y_2)$, $P_3(x_2, y_1)$, and $P_4(x_1, y_2)$ are four vertex coordinates corresponding to the vehicle boundary box in pixel-level coordinates, $b_0$, $b_1$, $b_2$, $b_3$, and $b_4$ are respectively $b_s$ corresponding to $P_0$, $P_1$, $P_2$, $P_3$, and $P_4$, $b_s$ is a half of a projection length corresponding to any point in horizontal projection, a frame width and a frame height of a video image are respectively $w$ and $h_0$, a focal length of a camera is $f$, $h$ is a height of the camera from the ground, $\theta$ is a vertical field of view of the camera, and $\phi$ is a vertical approach angle of the camera, $$\phi = 90° - \alpha - \frac{\theta}{2}, \alpha$$

is a pitch of the camera, and $P_0$ is centroid coordinates of a rectangular vehicle boundary box in the pixel coordinate system.

2. The method for positioning a moving target based on a camera pitch according to claim 1, wherein target detection is performed on the moving target in the to-be-detected video by using YOLOv5, to obtain the moving target, and target tracking is performed on the moving target by using DeepSORT, to obtain the vehicle trajectory.

3. The method for positioning a moving target based on a camera pitch according to claim 1, wherein specific steps of performing target detection on the moving target in the to-be-detected video by using YOLOv5 are:
  segmenting the to-be-detected video into grids;
  performing prediction on each of the grids to obtain a boundary box and a probability that each of boundary boxes belongs to a different category; and
  removing, by using a non-maximum suppression algorithm, boundary boxes whose overlapping exceeds a specified threshold, and selecting a final detection result.

4. The method for positioning a moving target based on a camera pitch according to claim 3, wherein specific steps of performing target tracking on the moving target by using DeepSORT are:
  predicting a location and a status of a target in a next frame by using a recursive Kalman filter algorithm, performing IOU matching on a prediction box and a boundary box, and selecting a prediction result having a higher confidence level;
  performing data correlation by using a linear weighting function based on a Mahalanobis distance of movement information and a cosine similarity of an appearance feature, and performing tracking trajectory matching through cascade allocation, to obtain a tracking result; and
  synchronously updating a tracker parameter and repeating an algorithm procedure.

5. The method for positioning a moving target based on a camera pitch according to claim 4, wherein specific steps of performing coordinate conversion on the vehicle trajectory by using the coordinate conversion method are:
  establishing the geodetic coordinate system according to a projection principle;
  obtaining a camera parameter and establishing the pixel coordinate system;
  calculating a conversion relationship between the geodetic coordinate system and the pixel coordinate system according to the vehicle trajectory; and
  converting pixel coordinates of the moving target photographed by the camera into geodetic coordinates based on the conversion relationship.

6. A non-transitory computer-readable storage medium, storing multiple instructions, wherein the instructions are configured to be loaded by a processor of a terminal device to perform the method for positioning a moving target based on a camera pitch according to claim 1.

7. A terminal device, comprising a processor and a non-transitory computer-readable storage medium, wherein the processor is configured to implement each instruction; and the non-transitory computer-readable storage medium is configured to store multiple instructions, and the instructions are configured to be loaded by a processor to perform the method for positioning a moving target based on a camera pitch according to claim 1.

8. A system for positioning a moving target based on a camera pitch, comprising:
  a target detection and tracking module, configured to obtain a to-be-detected video, and perform target detection and target tracking on a moving target in the video, to obtain a vehicle trajectory;
  a coordinate conversion module, configured to perform coordinate conversion on the vehicle trajectory by using a coordinate conversion method; and
  an error correction module, configured to perform positioning correction on the vehicle trajectory by using an error correction method, to obtain final vehicle positioning, wherein a positioning correction process comprises: obtaining a camera height and a camera pitch, constructing a relationship between a camera height and a camera pitch and a coordinate conversion error, calculating a coordinate conversion error according to the relationship between a camera height and a camera pitch and a coordinate conversion error, and calculating a target actual vehicle location based on the coordinate conversion error, to obtain vehicle positioning coordinates;
  wherein, specific steps of constructing a relationship between a camera height and a camera pitch and a coordinate conversion error are:
  calculating centroid coordinates of a target vehicle boundary box in a pixel coordinate system;
  calculating centroid coordinates of the target vehicle boundary box in a geodetic coordinate system after coordinate conversion; and
  determining the relationship between a camera height and a camera pitch and a coordinate conversion error according to a difference between the centroid coordinates of the pixel coordinate system and the centroid coordinates of the geodetic coordinate system; wherein the relationship between a camera height and a camera pitch and a coordinate conversion error is represented as:

$$\Delta X = \frac{4b_0(x_1 + x_2 - w) - b_1(2x_1 - w) - b_2(2x_2 - w) - b_3(2x_2 - w) - b_4(2x_1 - w)}{4w};$$

and $$\Delta Y = 2h\tan\left(\phi + \arctan\frac{h_0 - y_1 - y_2}{2f}\right) - \frac{1}{6}h\tan\left(\phi + \arctan\frac{h_0 - 2y_1}{2f}\right) - \frac{2}{3}h\tan\left(\phi + \arctan\frac{h_0 - 2y_2}{2f}\right);$$

wherein, $\Delta X$ represents a horizontal coordinate error after coordinate conversion, $\Delta Y$ represents a vertical coordinate error after coordinate conversion, $P_1(x_1, y_1)$, $P_2(x_2, y_2)$, $P_3(x_2, y_1)$, and $P_4(x_1, y_2)$ are four vertex coordinates corresponding to the vehicle boundary box in pixel-level coordinates, $b_0$, $b_1$, $b_2$, $b_3$, and $b_4$ are respectively $b_s$ corresponding to $P_0$, $P_1$, $P_2$, $P_3$, and $P_4$, $b_s$ is a half of a projection length corresponding to any point in horizontal projection, a frame width and a frame height of a video image are respectively w and $h_0$, a focal length of a camera is f, h is a height of the camera from the ground, $\theta$ is a vertical field of view of the camera, and $\phi$ is a vertical approach angle of the camera, $$\phi = 90° - \alpha - \frac{\theta}{2}, \alpha$$

is a pitch of the camera, and $P_0$ is centroid coordinates of a rectangular vehicle boundary box in the pixel coordinate system.

\* \* \* \* \*